United States Patent
Majumder et al.

(10) Patent No.: US 10,971,934 B2
(45) Date of Patent: Apr. 6, 2021

(54) DISTRIBUTION NETWORKS WITH FLEXIBLE DIRECT CURRENT INTERCONNECTION SYSTEM

(71) Applicant: ABB Schweiz AG, Baden (CH)

(72) Inventors: Ritwik Majumder, Vasteras (SE); Frans Dijkhuizen, Västerås (SE); Bertil Berggren, Västerås (SE)

(73) Assignee: ABB Schweiz AG, Baden (CH)

( * ) Notice: Subject to any disclaimer, the term of this patent is extended or adjusted under 35 U.S.C. 154(b) by 214 days.

(21) Appl. No.: 16/236,873

(22) Filed: Dec. 31, 2018

(65) Prior Publication Data

US 2020/0212679 A1 Jul. 2, 2020

(51) Int. Cl.
*H02J 3/36* (2006.01)
*H02J 3/00* (2006.01)
(Continued)

(52) U.S. Cl.
CPC ............... *H02J 3/36* (2013.01); *H02J 3/001* (2020.01); *H02J 3/0075* (2020.01);
(Continued)

(58) Field of Classification Search
CPC ............. H02J 3/36; H02J 3/001–00125; H02J 3/007–0075; H02J 3/04–08; H02J 3/34;
(Continued)

(56) References Cited

U.S. PATENT DOCUMENTS 6,459,998 B1 10/2002 Hoffman
9,698,569 B2 7/2017 Leyh
(Continued)

FOREIGN PATENT DOCUMENTS

CA 2910713 A1 5/2016
CA 2913441 A1 5/2016
(Continued)

OTHER PUBLICATIONS

Patent Cooperation Treaty, International Search Report and Written Opinion in corresponding application No. PCT/IB19/61045, dated Mar. 10, 2020, 16 pp.
(Continued)

*Primary Examiner* — Daniel J Cavallari
*Assistant Examiner* — David A Shiao
(74) *Attorney, Agent, or Firm* — Taft Stettinius & Hollister LLP

(57) ABSTRACT

Systems, methods, techniques, and apparatuses of a medium voltage alternating current (MVAC) network are disclosed. One exemplary embodiment is a direct current (DC) interconnection system for an MVAC distribution network including an AC/AC power converter including a first AC terminal and a second AC terminal; a plurality of switching devices structured to selectively couple a first AC terminal to a plurality of feeder line points in the MVAC network; and a control system structured to receive a set of measurements, calculate a headroom value for each feeder line point using the set of measurements, select a first feeder line point using the calculated headroom values, operate the plurality of switching devices so as to couple the first AC terminal to the first feeder line point, and operate the AC/AC power converter so as to transmit MVAC power from the first AC terminal to the first feeder line point.

20 Claims, 6 Drawing Sheets

(51) Int. Cl.
*H02J 13/00* (2006.01)
*H02M 5/40* (2006.01)
*H02J 3/06* (2006.01)

(52) U.S. Cl.
CPC ....... *H02J 13/00036* (2020.01); *H02J 3/0073* (2020.01); *H02J 3/06* (2013.01); *H02J 13/00034* (2020.01); *H02M 5/40* (2013.01); *Y02E 60/60* (2013.01)

(58) Field of Classification Search
CPC .. H02J 13/0036–0004; H02M 5/40–48; Y02E 60/60
See application file for complete search history.

(56) References Cited

U.S. PATENT DOCUMENTS

| | | | |
|---|---|---|---|
| 9,893,633 | B1 | 2/2018 | Li et al. |
| 2002/0012210 | A1 | 1/2002 | Morris et al. |
| 2004/0098142 | A1* | 5/2004 | Warren ............. H02J 3/06 700/22 |
| 2005/0168891 | A1 | 8/2005 | Nilman-Johansson et al. |
| 2007/0069583 | A1* | 3/2007 | Bourgeau ........... H02J 3/36 307/19 |
| 2008/0084643 | A1* | 4/2008 | Flottemesch ....... H02M 5/458 361/93.2 |
| 2010/0076618 | A1* | 3/2010 | El-Gasseir ......... H02J 3/008 700/297 |
| 2012/0033462 | A1* | 2/2012 | Juhlin ............... H02J 3/36 363/35 |
| 2014/0062196 | A1* | 3/2014 | Wijekoon ........... H02H 7/267 307/39 |
| 2014/0379157 | A1* | 12/2014 | Das ................... H02J 3/34 700/295 |
| 2015/0349655 | A1 | 12/2015 | Petersen et al. |
| 2016/0056729 | A1 | 2/2016 | Tenca |
| 2016/0146192 | A1 | 5/2016 | Kurthakoti Chandrashekhara et al. |
| 2016/0181802 | A1 | 6/2016 | Jacobson |
| 2016/0211669 | A1* | 7/2016 | Barker ............... H02H 7/1252 |
| 2016/0336928 | A1 | 11/2016 | Kuznetsov |
| 2016/0380429 | A1 | 12/2016 | Krstic |
| 2017/0077699 | A1 | 3/2017 | Kondabathini et al. |
| 2017/0077746 | A1 | 3/2017 | Kanakasabai et al. |
| 2017/0110969 | A1 | 4/2017 | Zhou et al. |
| 2017/0141694 | A1 | 5/2017 | Keister et al. |
| 2017/0338651 | A1 | 11/2017 | Fishman et al. |
| 2017/0338748 | A1 | 11/2017 | Liang et al. |
| 2017/0346398 | A1 | 11/2017 | Long et al. |
| 2018/0006570 | A1 | 1/2018 | Keister et al. |
| 2018/0115152 | A1* | 4/2018 | Gupta ............... H02J 3/36 |
| 2020/0161852 | A1* | 5/2020 | Ishida ............... H02M 7/53871 |

FOREIGN PATENT DOCUMENTS

| | | |
|---|---|---|
| CN | 201457837 U | 5/2010 |
| CN | 102545200 A | 7/2012 |
| CN | 202840667 U | 3/2013 |
| CN | 104218805 A | 12/2014 |
| CN | 104320000 A | 1/2015 |
| CN | 104333033 A | 2/2015 |
| CN | 104485821 A | 4/2015 |
| CN | 104539187 A | 4/2015 |
| CN | 102938564 B | 5/2015 |
| CN | 204333981 U | 5/2015 |
| CN | 204391761 U | 6/2015 |
| CN | 104852583 A | 8/2015 |
| CN | 105023058 A | 11/2015 |
| CN | 105634273 A | 6/2016 |
| CN | 105719196 A | 6/2016 |
| CN | 105762790 A | 7/2016 |
| CN | 105790294 A | 7/2016 |
| CN | 105811447 A | 7/2016 |
| CN | 205430053 U | 8/2016 |
| CN | 205544542 U | 8/2016 |
| CN | 106099900 A | 11/2016 |
| CN | 106229984 A | 12/2016 |
| CN | 106356834 A | 1/2017 |
| CN | 106357138 A | 1/2017 |
| CN | 106451439 A | 2/2017 |
| CN | 106505558 A | 3/2017 |
| CN | 106602608 A | 4/2017 |
| CN | 206117151 U | 4/2017 |
| CN | 104934972 B | 5/2017 |
| CN | 106655267 A | 5/2017 |
| CN | 106711994 A | 5/2017 |
| CN | 106712561 A | 5/2017 |
| CN | 106786598 A | 5/2017 |
| CN | 206302343 U | 7/2017 |
| CN | 107070249 A | 8/2017 |
| CN | 107086787 A | 8/2017 |
| CN | 107086806 A | 8/2017 |
| CN | 107104416 A | 8/2017 |
| CN | 107257121 A | 10/2017 |
| CN | 107332443 A | 11/2017 |
| CN | 107565834 A | 1/2018 |
| CN | 107592017 A | 1/2018 |
| CN | 107612012 A | 1/2018 |
| CN | 107681886 A | 2/2018 |
| CN | 107706905 A | 2/2018 |
| CN | 107786099 A | 3/2018 |
| CN | 107800298 A | 3/2018 |
| CN | 107800299 A | 3/2018 |
| CN | 107834854 A | 3/2018 |
| CN | 107863884 A | 3/2018 |
| CN | 107687924 A | 4/2018 |
| CN | 107947146 A | 4/2018 |
| CN | 107968570 A | 4/2018 |
| CN | 107968572 A | 4/2018 |
| CN | 207339264 U | 5/2018 |
| CN | 107733244 A | 12/2018 |
| EP | 0333139 A1 | 9/1989 |
| EP | 2996237 A1 | 3/2016 |
| EP | 3018794 A1 | 5/2016 |
| EP | 3062434 A1 | 8/2016 |
| EP | 3109992 A1 | 12/2016 |
| IN | 1246/CHE/2013 A | 9/2013 |
| JP | 2001298850 A | 10/2001 |
| JP | 2002191105 A | 7/2002 |
| JP | 2007020373 A | 1/2007 |
| JP | 2012029501 A | 2/2012 |
| KR | 20160040378 A | 4/2016 |
| KR | 20160081067 A | 7/2016 |
| WO | 2012116748 A1 | 9/2012 |
| WO | 2015090365 A1 | 6/2015 |
| WO | 2016054412 A1 | 4/2016 |
| WO | 2017058253 A1 | 4/2017 |
| WO | 2018041338 A1 | 3/2018 |
| WO | 2018072837 A1 | 4/2018 |
| WO | 2018079905 A1 | 5/2018 |

OTHER PUBLICATIONS

R. T. Pinto et al, "Optimal Operation of DC Networks to Support Power System Outage Management," IEEE Transactions on Smart Grid, dated Nov. 2016, pp. 2953-2961, vol. 7, No. 6, IEEE, Piscataway, US.

A. Shekhar et al., "Reconfigurable DC Links for Restructuring Existing Medium Voltage AC Distribution Grids," Electric Power Components and Systems, dated Jan. 16, 2018, last accessed Oct. 4. 2018, available at https://www.tandfonline.com/doi/pdf/10.1080/15325008.2017.1346005?needAccess=true.

X.B. Guo et al., "A Coordinated Optimization Method of SNOP and Tie Switch Operation Simultaneously Based on Cost in Active Distribution Network," CIRED Workshop 2016, dated Feb. 23, 2017, 4 pages, IET, New Jersey, USA.

* cited by examiner

■ = Closed Switching Device
□ = Open Switching Device

■ = Closed Switching Device
□ = Open Switching Device

■ = Closed Switching Device
□ = Open Switching Device

DISTRIBUTION NETWORKS WITH FLEXIBLE DIRECT CURRENT INTERCONNECTION SYSTEM

BACKGROUND

The present disclosure relates generally to medium voltage alternating current (MVAC) distribution networks. As high-demand loads and distributed energy resources are added to MVAC and low voltage alternating current (LVAC) distribution networks, different portions of the same network may experience mismatched power demands. Existing MVAC distribution networks suffer from a number of shortcomings and disadvantages. There remain unmet needs including increasing reliability, minimizing capacity constraints, and reducing power losses. For instance, a feeder line of an MVAC network may transmit power close to line capacity causing significant power losses and thermal stresses compared to another feeder line of the same MVAC network transmitting power significantly lower than line capacity. Balancing headroom by connecting the feeders using a tie switch arranges a network in a meshed configuration, requiring additional power flow control and protection. Furthermore, closing a tie switch may not be possible due to differences in voltage or phase angle. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for medium voltage alternating current distribution networks. Further embodiments, forms, objects, features, advantages, aspects, and benefits of the disclosure shall become apparent from the following description and drawings.

DETAILED DESCRIPTION OF ILLUSTRATIVE EMBODIMENTS

Figure 1:
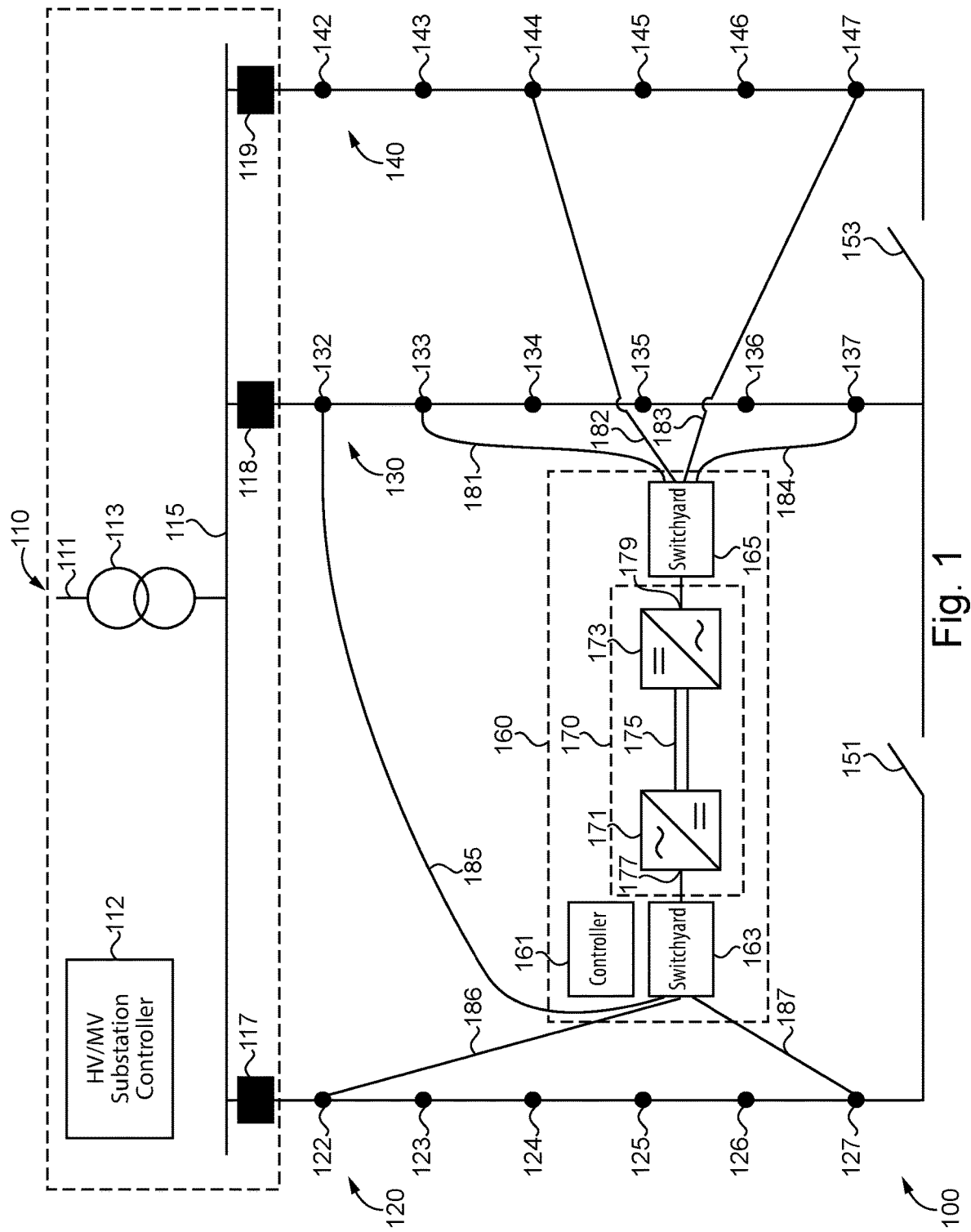
FIG. 1 illustrates an exemplary distribution network.

With reference to FIG. 1, there is illustrated an exemplary medium voltage alternating current (MVAC) distribution network 100 structured to receive high voltage alternating current (HVAC) power from a power transmission network line 111 and provide MVAC power through feeder lines to medium voltage loads or medium voltage/low voltage (MV/LV) substations coupled to the feeder lines. It shall be appreciated that, for certain applications, medium voltage refers to a voltage greater than or equal to 1 kV and less than 100 kV and low voltage refers to a voltage less than 1 kV. For certain other applications, medium voltage refers to a voltage greater than or equal to 1 kV and less or equal to 72 kV and low voltage refers to a voltage less than 1 kV. It shall also be appreciated that the topology of network 100 is illustrated for the purpose of explanation and is not intended as a limitation of the present disclosure. Although network 100 is illustrated with a single line diagram, network 100 may be structured to transmit single-phase or multiphase power.

Network 100 includes a high voltage/medium voltage (HV/MV) substation 110 coupled to a high voltage transmission network including line 111. Substation 110 includes a step-down transformer 113 coupled to line 111, an MVAC bus 115 coupled to transformer 113, and switching devices 117-119 coupled to bus 115. Step-down transformer 113 is structured to receive HVAC power from line 111, step-down the high voltage of the HVAC power to medium voltage, and output MVAC power to MV bus 115. It shall be appreciated that the switching devices of network 100, including switching devices 117-119, may include a circuit breaker, a disconnector switch, or any other type of switching device structured to interrupt the flow of current in an MVAC distribution network.

Substation 110 includes an HV/MV substation controller 112 structured to communicate with wide area controllers, such as a supervisory control and data acquisition (SCADA) system or system operator; controllable devices within network 100 including switching devices 117-119 or tie switching devices 151 and 153; a plurality of measuring devices within network 100 such as feeder line voltage and current sensors; and distribution network controllers, such as DC interconnection controller 161. Substation controller 112 is structured to operate the controllable devices of network 100 in response to receiving instructions or information from a wide area controller, receiving instructions or information from distribution network controllers, or in response to detecting a fault within network 100, to name but a few examples.

A plurality of feeder lines is coupled to bus 115 by way of switching devices 117-119. Each switching device 117-119 is structured to selectively interrupt the flow of MVAC power from transformer 113 to one feeder line. The plurality of feeder lines includes feeder lines 120, 130, and 140. Line 120 is coupled to switching device 117. Line 130 is coupled to switching device 118. Line 140 is coupled to switching device 119.

Feeder line 120 includes feeder line points 122-127 where MV/LV substations, distributed energy resources, or MV loads are coupled to feeder line 120. Feeder line 130 includes feeder line points 132-137 where MV/LV substations or MV loads are coupled to feeder line 130. Feeder line 140 includes feeder line points 142-147 where MV/LV substations or MV loads are coupled to feeder line 140. The ends of feeder lines 120 and 130 are selectively coupled together by way of tie switch 151, and the ends of feeder lines 130 and 140 are selectively coupled by way of tie switch 153.

Each feeder line may include a plurality of switching devices coupled between the feeder line points. HV/MV substation controller 112 is structured to operate one or more of said switching devices effective to isolate a portion of a feeder line in response to detecting a fault located in the portion to be isolated.

Network 100 includes a DC interconnection system 160 structured to selectively connect a point on one feeder line to another point within network 100 and provide power between the two points. System 160 may be structured to connect to any point on a feeder line, including one of the feeder line points of the feeder lines, a line segment between feeder line points, or at the end of the feeder line.

DC interconnection system 160 includes switchyards 163 and 165, AC/AC power converter 170, and DC interconnection controller 161. Switchyard 163 includes a plurality of switching devices structured to selectively couple AC terminal 177 of AC/AC power converter 170 to point 122 by way of line 186, point 127 by way of line 187, or point 132 by way of line 185. Switchyard 165 includes a plurality of switching devices structured to selectively couple AC terminal 179 of AC/AC power converter 170 to point 133 by way of line 181, point 144 by way of line 182, or point 137 by way of line 184. Each switchyard may be structured to selectively couple more or fewer points of network 100 to an AC terminal, including points on the same feeder line, points on feeder lines coupled to one HV/MV substation, or points on feeder lines coupled to separate HV/MV substations in the same MV distribution network.

AC/AC power converter 170, also known as a DC link, includes AC/DC power converters 171 and 173 coupled together by a DC bus 175. AC/DC power converter 171 is coupled to AC terminal 177 and AC/DC power converter 173 is coupled to AC terminal 179. AC/AC power converter 170 is structured to receive MVAC power at AC terminal 177, convert the received power to medium voltage direct current (MVDC) power using AC/DC power converter 171, transmit the MVDC power using DC bus 175, convert the MVDC power to MVAC power using AC/DC power converter 173, and output MVAC power at AC terminal 179. AC/AC power converter 170 may be bidirectional such that AC/AC power converter 170 is also structured to receive MVAC power at terminal 179, convert the received power to MVDC power using AC/DC power converter 173, transmit the MVDC power using DC bus 175, convert the MVDC power to MVAC power using AC/DC power converter 171, and output MVAC power at AC terminal 177. In certain embodiments, DC bus 175 may be replaced by a DC transmission line so that converters 173 are located remotely from each other.

DC interconnection controller 161 is structured to operate AC/AC power converter 170 and switchyards 163 and 165 using measurements received from measuring devices of network 100. As explained in further detail below, controller 161 operates converter 170 in order to balance headroom of the feeder lines in network 100. Headroom may refer to a remaining current capacity relative to a current rating of a feeder line. For example, if a 3 kA feeder line is transmitting 1 kA, the headroom of the feeder line is 2 kA. A negative headroom value indicates the feeder line is overloaded, i.e. transmitting more current than its current rating. In other embodiments, headroom may refer to a remaining power capacity relative to a power rating of a feeder line, or a remaining voltage capacity relative to a voltage rating of a feeder line. Since DC interconnection system 160 uses AC/DC/AC power conversion to transfer power, it is possible to transfer power between feeder lines experiencing different voltage magnitudes, different phase angles, or other conditions unsuitable for power transfer switches with tie switches alone. Controller 161 may operate converter 170 in response to periodic polling of the measuring devices or in response to a detected fault within network 100.

It shall be appreciated that any or all of the foregoing features of network 100 may also be present in the other MVAC distribution networks disclosed herein. While the embodiments described hereinafter may not specifically describe features analogous to the features of network 100, such features may nonetheless be employed in connection with the described systems.

Figure 2:
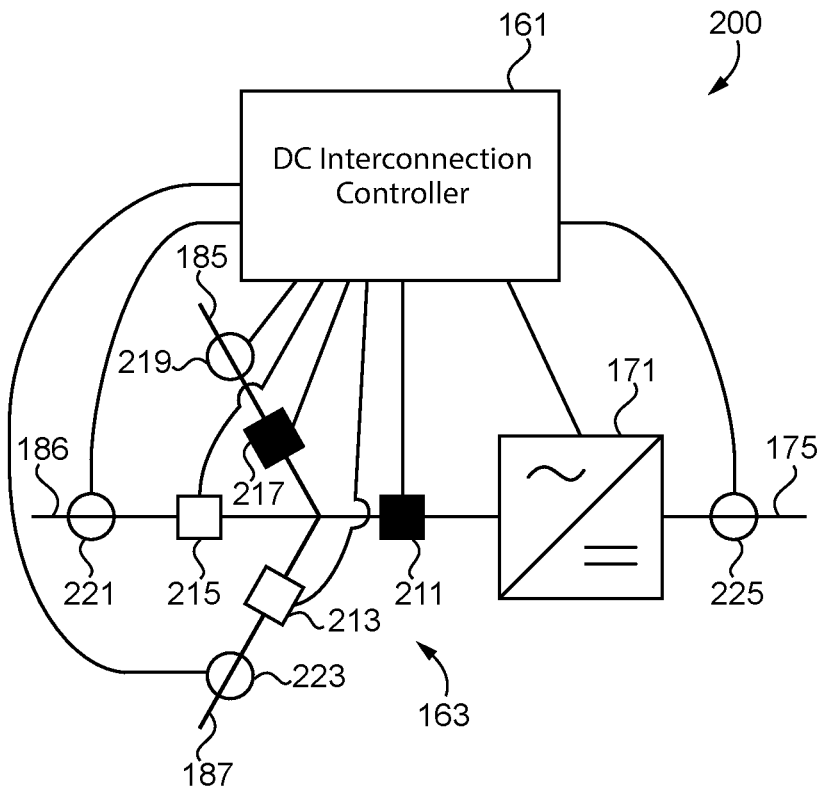
FIG. 2 illustrates a portion of the exemplary distribution network in FIG. 1.

With reference to FIG. 2, there is illustrated a portion 200 of MVAC distribution network 100. Specifically, portion 200 includes AC/DC power converter 171, DC interconnection controller 161, a plurality of measuring devices, and switchyard 163. The plurality of measuring devices includes sensor 219 coupled to line 185, sensor 221 coupled to line 186, sensor 223 coupled to line 187, and sensor 225 coupled to DC bus 175. Each sensor is structured to measure electrical characteristics of the corresponding line, such as current, voltage, or power. In other embodiments, each sensor may be replaced by a current transformer, a voltage transformer, or a set of sensors, to name but a few examples. In other embodiments, the sensors structured to generate a set of measurements for controller 161 may be located at feeder line points, such as within an MV/LV substation, or coupled to a feeder line segment, to name but a few examples.

Switchyard 163 includes switching devices 211, 213, 215, and 217. Switching device 211 is coupled between AC/DC power converter 171 and a common point for lines 185-187 and structured to selectively interrupt the flow of current between AC/DC power converter 171 and lines 185-187. Switching device 213 is coupled to line 187 and structured to selectively interrupt the flow of current through line 187. Switching device 215 is coupled to line 186 and structured to selectively interrupt the flow of current through line 186. Switching device 217 is coupled to line 185 and structured to selectively interrupt the flow of current through line 185.

The switching devices of switchyard 163 are controlled so as to selectively couple AC/DC power converter to one of lines 185-187. In order to reconfigure the connection of the DC interconnection system 160, each switching device of a switchyard may be briefly opened so as to interrupt the flow of power through the switchyard. Once all switching devices are opened, some of the switching devices may be closed so as to couple AC/AC power converter 170 with the newly selected feeder line point. For example, switchyard 163 may first open switching device 211 structured to interrupt load current through switchyard 163, then open any remaining switching devices not structured to interrupt load current. In another example, AC/AC power converter 170 is controlled by controller 161 to reduce the current through switchyard 163 to zero before the switching devices of switchyard 163 are opened. In certain embodiments, switchyard 163 does not include switching device 211 and each of the other switching devices is structured to interrupt load current.

It shall be appreciated that any or all of the foregoing features of portion 200 may also be present in the other MVAC distribution networks disclosed herein. While the embodiments described herein may not specifically describe features analogous to the features of portion 200, such features may nonetheless be employed in connection with the described systems.

Figure 3:
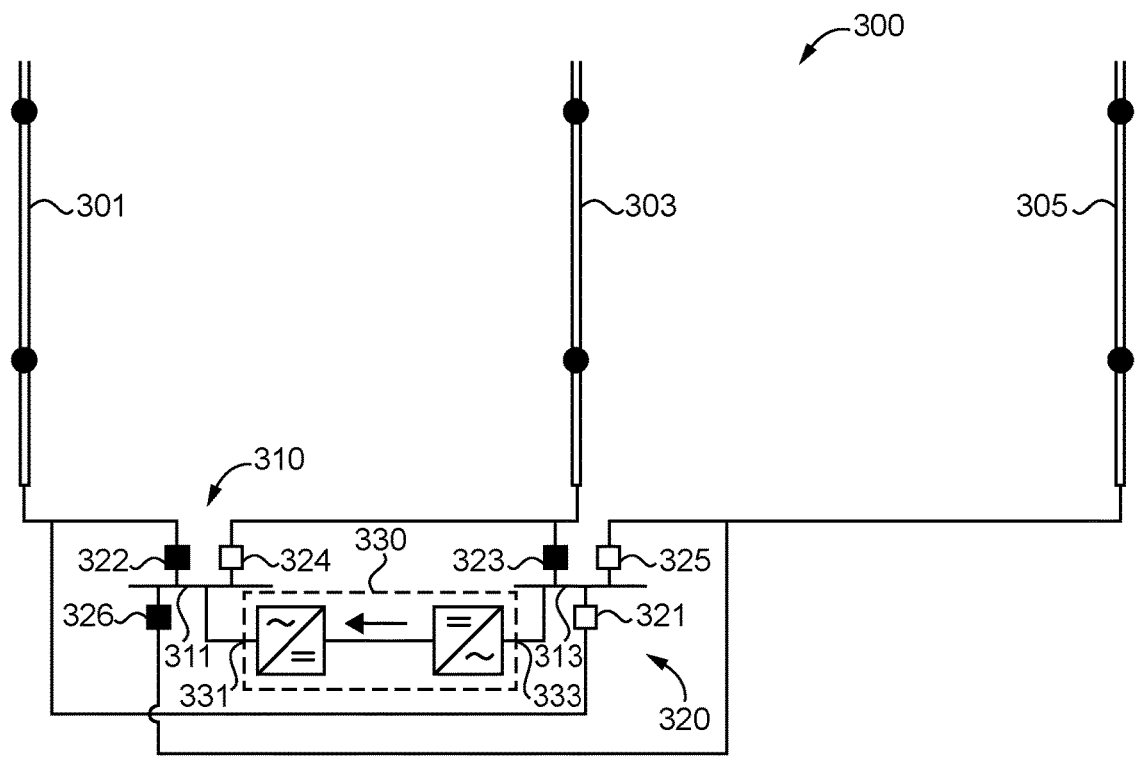
FIGS. 3-4 illustrate exemplary distribution networks with a DC interconnection system coupled at feeder ends.

With reference to FIG. 3, there is illustrated an exemplary MVAC distribution network 300 including a DC interconnection system 310 coupled to the end of feeder lines 301, 303, and 305. DC interconnection system 310 includes an AC/AC power converter 330 and a plurality of switching devices 320. AC/AC power converter 330 is structured to receive MVAC power from one feeder line and output MVAC power to another feeder line. The plurality of switching devices 320 is structured to selectively couple one end of AC/AC power converter 330 to a power-providing feeder line and a second end of the AC/AC power converter 330 to a power-receiving feeder line.

The plurality of switching devices 320 includes switching device 322 coupled between line 301 and an MVAC bus 311, switching device 324 coupled between line 303 and bus 311, switching device 326 coupled between line 305 and bus 311, switching device 321 coupled between line 301 and an MVAC bus 313, switching device 323 coupled between line 303 and bus 313, and switching device 325 coupled between line 305 and bus 313. One end 331 of AC/AC power converter 330 is coupled to MVAC bus 311 and another end of converter 330 is coupled to MVAC bus 313.

In the illustrated embodiment, power from lines 303 and 305 is being transferred to line 301. Switching devices 322, 326, and 323 are closed. Switching devices 324, 325, and 321 are open. Power from line 303 is transmitted to line 301 by way of switching device 323, then MVAC bus 313, then AC/AC power converter 330, then MVAC bus 311, and finally switching device 322. Power from line 305 is transmitted to line 301 by way of switching device 326, then MVAC bus 311, and finally switching device 322.

System 310 may transfer power between any two feeder lines or transfer power from two healthy feeder lines to a fault-isolated feeder line portion. For the purposes of illustrating the flexibility of DC interconnection system 310, consider the following examples. First, consider a base configuration where the plurality of switching devices are all open and AC/AC power converter 330 is disconnected from all feeder lines. If switching devices 322 and 323 are closed, power may be transferred between feeder lines 301 and 303 using AC/AC power converter 330. If instead switching devices 322 and 325 are closed, power may be transferred between feeder lines 301 and 305 using AC/AC power converter 330. If instead switching devices 324 and 325 are closed, power may be transferred between feeder lines 303 and 305 using AC/AC power converter 330. It is important to note switching devices 321 and 326 are not needed to connect one feeder line to another by way of AC/AC power converter 330. Each feeder line may also receive power from multiple feeder lines in certain circumstances, such as following a fault where a healthy portion of a feeder line is isolated. For example, where a fault occurs on feeder line 301, switching devices 322 and 326 may be closed so as to directly connect feeder line 301 to feeder line 305, and switching device 323 may be closed to as to connect feeder lines 301 and 303 by way of AC/AC power converter 330.

It shall be appreciated that any or all of the foregoing features of network 300 may also be present in the other MVAC distribution networks disclosed herein. While the embodiments described herein may not specifically describe features analogous to the features of network 300, such features may nonetheless be employed in connection with the described systems.

Figure 4:
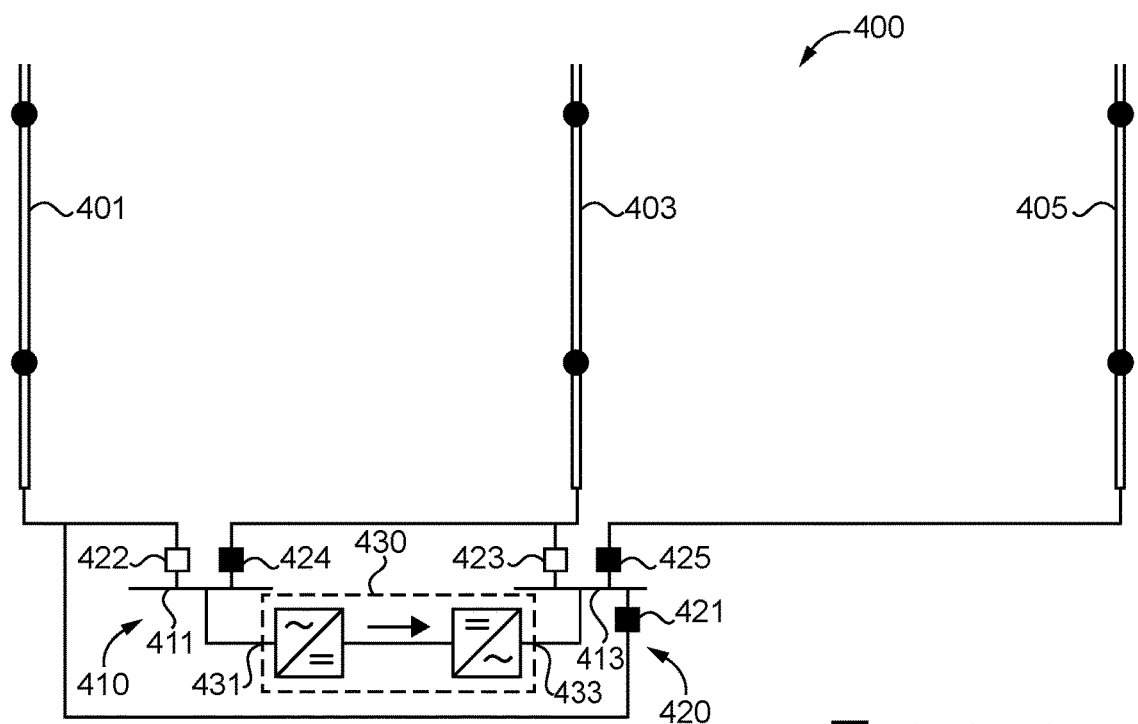

With reference to FIG. 4, there is illustrated an exemplary MVAC distribution network 400 including a DC interconnection system 410 coupled to the end of feeder lines 401, 403, and 405. DC interconnection system 410 includes an AC/AC power converter 430 and a plurality of switching devices 420. The AC/AC power converter 430 is structured to receive MVAC power from one feeder line and output MVAC power to another feeder line. The plurality of switching devices 420 is structured to selectively couple one end of AC/AC power converter 430 to a power-providing feeder line and a second end of the AC/AC power converter 430 to a power-receiving feeder line.

The plurality of switching devices 420 includes switching device 422 coupled between line 401 and an MVAC bus 411, switching device 424 coupled between line 403 and bus 411, switching device 421 coupled between line 401 and an MVAC bus 413, switching device 423 coupled between line 403 and bus 413, and switching device 425 coupled between line 405 and bus 413. One end 431 of AC/AC power converter 430 is coupled to MVAC bus 411 and another end 433 of converter 430 is coupled to MVAC bus 413.

In the illustrated embodiment, power from lines 403 and 405 is being transferred to line 401. Switching devices 424, 421, and 425 are closed. Switching devices 422 and 423 are open. Power from line 403 is transmitted to line 401 by way of switching device 424, then an MVAC bus 411, then AC/AC power converter 430, then an MVAC bus 413, and finally switching device 421. Power from line 405 is transmitted to line 401 by way of switching device 425, then MVAC bus 413, and finally switching device 421. It is important to note the plurality of switching devices 420 is able to perform all the same combinations of power transfer as the plurality of switching devices in FIG. 3 with one less switching device. It shall be appreciated that any or all of the foregoing features of network 400 may also be present in the other MVAC distribution networks disclosed herein. While the embodiments described herein may not specifically describe features analogous to the features of network 400, such features may nonetheless be employed in connection with the described systems.

Figure 5:
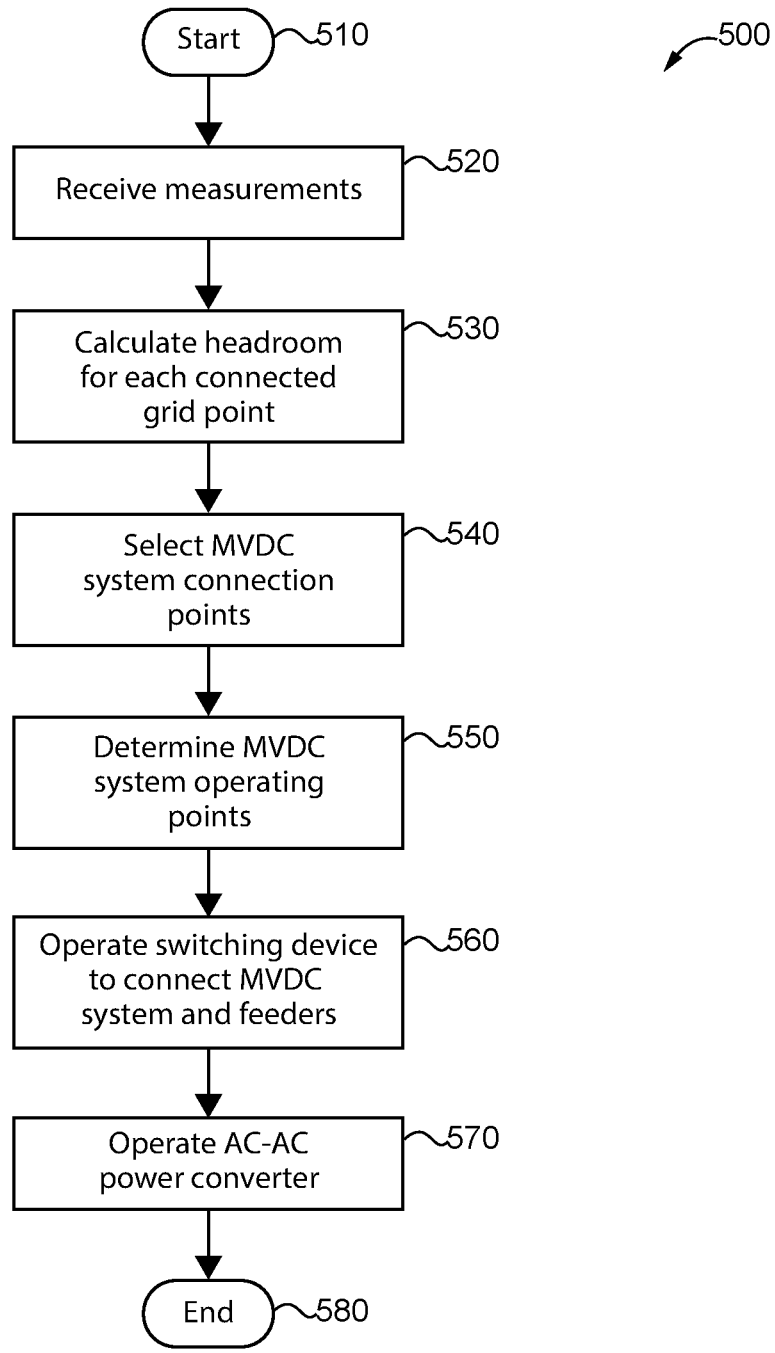
FIG. 5 is a flowchart illustrating an exemplary distribution network control process.

With reference to FIG. 5, there is illustrated an exemplary process 500 for operating a DC interconnection system of an MVAC distribution network using one or more of the controllers in a control system including a DC interconnection controller, a substation controller, a distribution management system controller, and a plurality of measuring devices. The following description of process 500 is made with reference to MVAC distribution network 100 illustrated in FIG. 1. In the illustrated embodiment, process 500 is implemented by substation controller 112 and DC interconnection controller 161. In other embodiments, process 500 may be implemented in whole or in part by any of the controllers in an MVAC distribution network control system. It is to be understood, however, that process 500 may be used in combination with other forms of MVAC distribution systems, such as those described above with reference to FIGS. 2-4 and 6-9. It shall be further appreciated that a number of variations and modifications to process 500 are contemplated including, for example, the omission of one or more aspects of process 500, the addition of further conditionals and operations, and/or the reorganization or separation of operations and conditionals into separate processes.

Process 500 begins at start operation 510. Process 500 may be executed at a regular time interval, or in response to a network condition, such as a detected fault, voltage abnormality, partial power loss, or in response to a command from a system operator, to name but a few examples. Process 500 then proceeds to operation 520 where controller 161 receives a set of measurements from a plurality of measuring devices. The set of measurements corresponds to electrical characteristics of a plurality of points on the feeder lines of network 100 selectively connectable to the DC interconnection system. In certain embodiments, the set of measurements also includes electrical characteristics of DC bus 175 of AC/AC power converter 170 of the DC interconnection system. Electrical characteristics may correspond to current, voltage, or power values, to name but a few examples.

Process 500 proceeds to operation 530 where controller 161 calculates the difference between the current at each feeder line point and a remaining current capacity of the feeder line point, also known as headroom. The electrical characteristics may include the set of measurements received in operation 520 or electrical characteristics derived from the set of measurements. The capacity may include a minimum voltage threshold, a maximum voltage threshold, a maximum current threshold, a thermal stress threshold, or a maximum power threshold, to name but a few examples. The capacity for each feeder line point may be a capacity corresponding to the entire feeder line or a capacity corresponding to a portion of a feeder line including the feeder line point. The headroom calculation may indicate a capacity of a feeder line point has been exceeded, such as an overcurrent or undervoltage condition.

Process 500 proceeds to operation 540 where controller 161 selects which feeder line points to couple to the AC/AC power converter. Controller 161 selects the feeder line points using the calculated headroom values in operation 530. For example, the feeder line point experiencing the smallest or negative headroom and the feeder line point experiencing the largest headroom may be selected. Feeder line points may also be selected so as to minimize system loss, maximize power restoration following a fault isolation, or maintain a desired voltage profile. In certain embodiments, controller 161 uses power forecasting models, market price signals, or other information from a system operator to select feeder line points.

Process 500 proceeds to operation 550 where controller 161 determines the operating points of the AC/AC power converter. The operating points may include an active power output operating point and a reactive power operating point, to name but a few examples. Operating points are effective to transfer power using the DC interconnection system without overloading any portion of the MVAC distribution network. Unlike a distribution network with only tie switching devices, MVAC distribution network 100 may transfer a determined amount of power from feeder line to feeder line, increasing the network's responsiveness to uneven loads in feeder lines. Operating points may be determined using one or more of the measurements of the feeder line points received in operation 520, the measurements of the DC bus received in operation 520, and the calculated headroom values from operation 530.

Process 500 proceeds to operation 560 where controller 161 operates switchyards 163 and 165 to couple AC terminals 177 and 179 to the feeder line points selected in operation 540. In certain embodiments, operation 540 includes controller 161 transmitting a command to substation controller 112 effective to operating one or more tie switches coupled between feeder lines.

Process 500 proceeds to operation 570 where controller 161 operates AC/AC power converter 170 according to the operating points determined in operation 550. The operation of the AC/AC power converter 170 is effective to increase the headroom of one point of the MVAC distribution network in order to reduce thermal stresses while preventing an overload at the other coupled point. Process 500 finally proceeds to end operation 580.

Figure 6A:
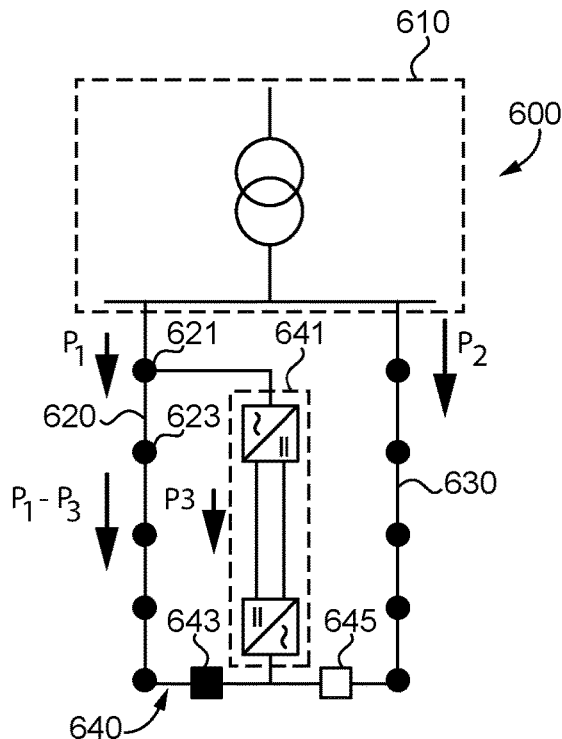
FIGS. 6A-9B illustrate power flow through exemplary distribution networks.
Figure 6B:
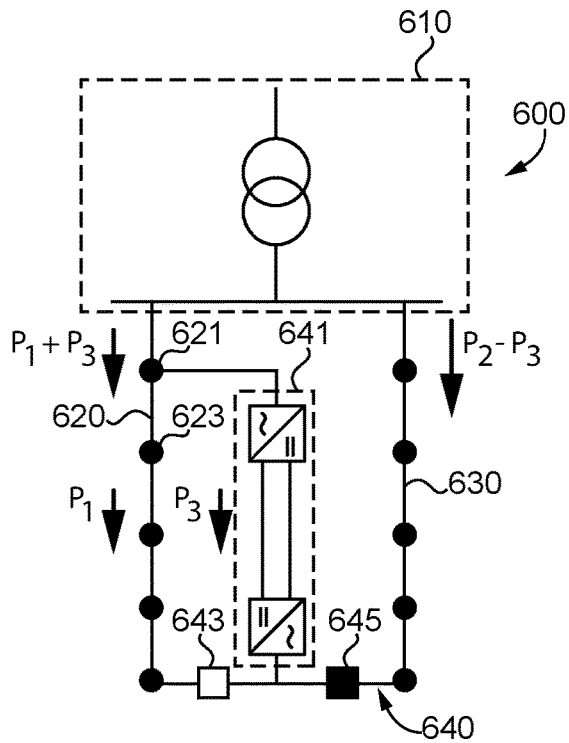

With reference to FIGS. 6A and 6B, there is illustrated an exemplary MVAC distribution network 600 including a DC interconnection system 640, a substation 610, and feeder lines 620 and 630. DC interconnection system 640 includes an AC/AC power converter 641 including one end coupled to a point 621 on feeder line 620 and a second end coupled to switching devices 643 and 645. When switching device 643 is closed, converter 641 is coupled to the end of feeder line 620. When switching device 645 is closed, converter 641 is coupled to the end of feeder line 630. It shall be appreciated that any or all of the foregoing features of network 600 may also be present in the other MVAC distribution networks disclosed herein. While the embodiments described herein may not specifically describe features analogous to the features of network 600, such features may nonetheless be employed in connection with the described systems.

As illustrated in FIG. 6A, DC interconnection system 640 is operated to increase headroom on portions of feeder line 620. Switching device 643 is closed and switching device 645 is open in order to couple the second end of converter 641 with the end of feeder line 620. Feeder line 620 receives power $P_1$ from substation 610. Converter 641 is being operated to transmit a portion of $P_1$, power $P_3$, directly from point 621 to the end of feeder line 620. The portion of feeder line 620 between point 621 and the end of the feeder line experiences a reduced power level and increased headroom.

As illustrated in FIG. 6B, DC interconnection system 640 is operated to increase headroom on feeder line 630. Switching device 643 is open and switching device 645 is closed to couple the second end of converter 641 with the end of feeder line 630. Feeder line 620 receives power $P_1$ plus power $P_3$ from substation 610. Converter 641 is operated to transmit power $P_3$ from point 621 to the end of feeder line 630, causing power $P_2$ flowing from substation 610 to be reduced by $P_3$.

Figure 7:
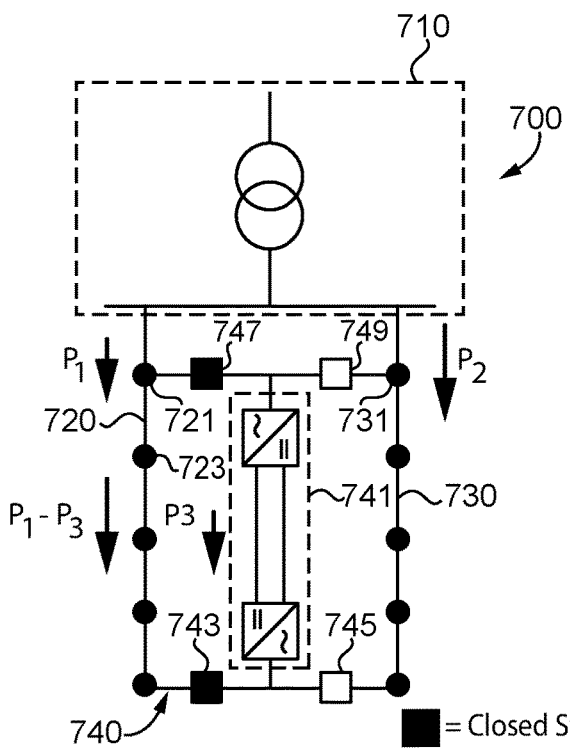

With reference to FIG. 7, there is illustrated an exemplary MVAC distribution network 700 including a DC interconnection system 740, a substation 710, and feeder lines 720 and 730. DC interconnection system 740 includes an AC/AC power converter 741 including a first end coupled to switching devices 747 and 749 and a second end coupled to switching devices 743 and 745.

When switching device 743 is closed, the second end of converter 741 is coupled to the end of feeder line 720. When switching device 745 is closed, the second end of converter 741 is coupled to the end of feeder line 730. When switching device 747 is closed, the first end of converter 741 is coupled to point 721 on feeder line 720. When switching device 749 is closed, the first end of converter 741 is coupled to point 731 on feeder line 730.

As illustrated, switching devices 747 and 743 are closed and feeder lines 720 and 730 receive power $P_1$ and $P_2$, respectively. Converter 741 is operated such that a portion $P_3$ of power $P_1$ is transmitted directly to the end of feeder line 720 through converter 741, causing the power level of a portion of feeder line 720 to be reduced by power $P_3$. It shall be appreciated that any or all of the foregoing features of network 700 may also be present in the other MVAC distribution networks disclosed herein. While the embodiments described herein may not specifically describe features analogous to the features of network 700, such features may nonetheless be employed in connection with the described systems.

Figure 8:
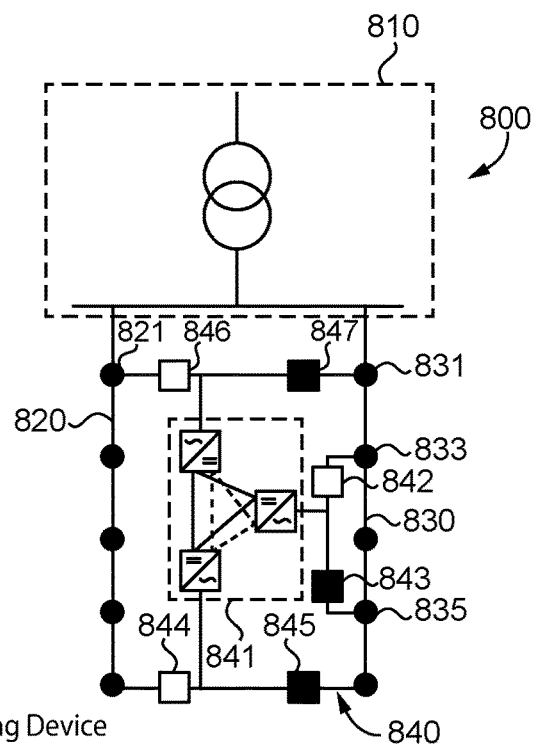

With reference to FIG. 8, there is illustrated an MVAC distribution network 800 including a DC interconnection system 840, a substation 810, and feeder lines 820 and 830. DC interconnection system 840 includes a three terminal AC/AC power converter 841 including a first end coupled to switching devices 844 and 845, a second end coupled to switching devices 846 and 847, and a third end coupled to switching devices 842 and 843.

When switching device 844 is closed, the first end of converter 841 is coupled to the end of feeder line 820. When switching device 845 is closed, the first end of converter 841 is coupled to the end of feeder line 830. When switching device 846 is closed, the second end of converter 841 is coupled to point 821 on feeder line 820. When switching device 847 is closed, the second end of converter 841 is coupled to point 831 on feeder line 830. When switching device 842 is closed, the third end of converter 841 is coupled to point 833 on feeder line 830. When switching device 843 is closed, the third end of converter 841 is coupled to point 835 on feeder line 830. It shall be appreciated that any or all of the foregoing features of network 800 may also be present in the other MVAC distribution networks disclosed herein. While the embodiments described herein may not specifically describe features analogous to the features of network 800, such features may nonetheless be employed in connection with the described systems.

Figure 9A:
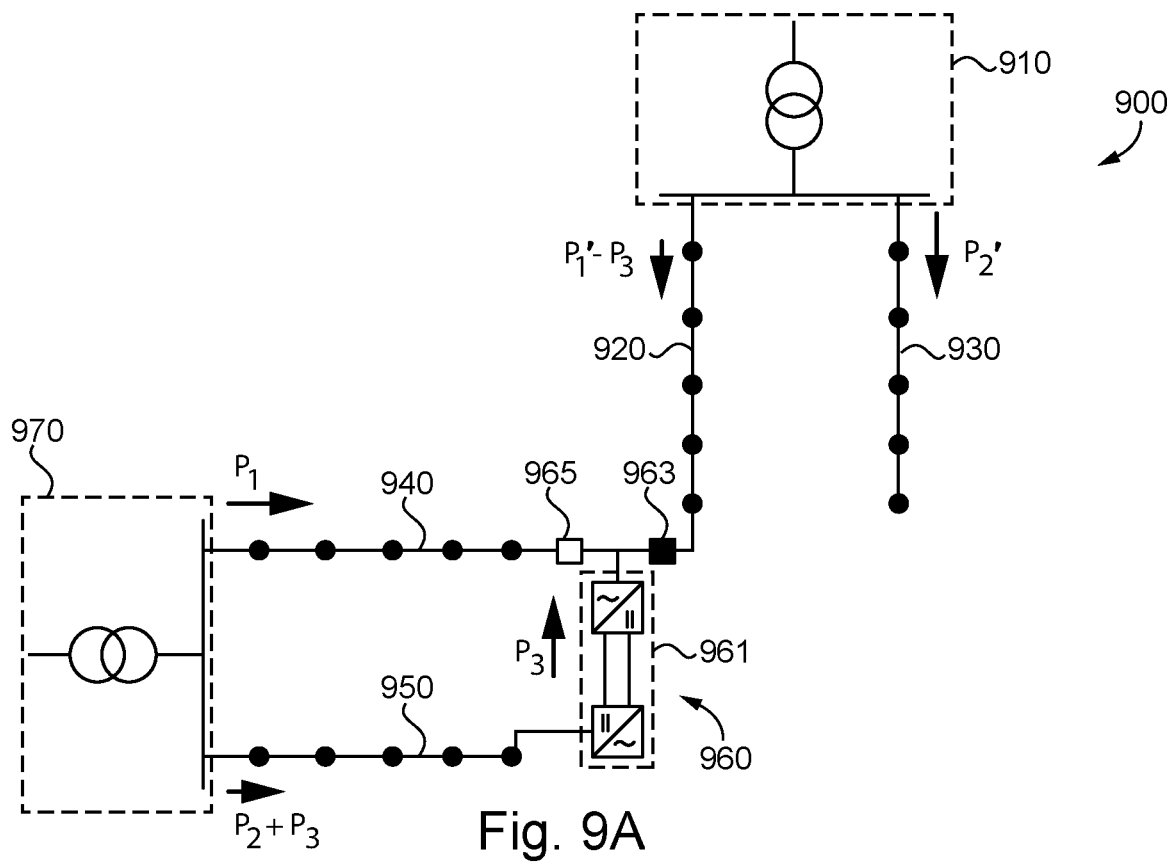
Figure 9B:
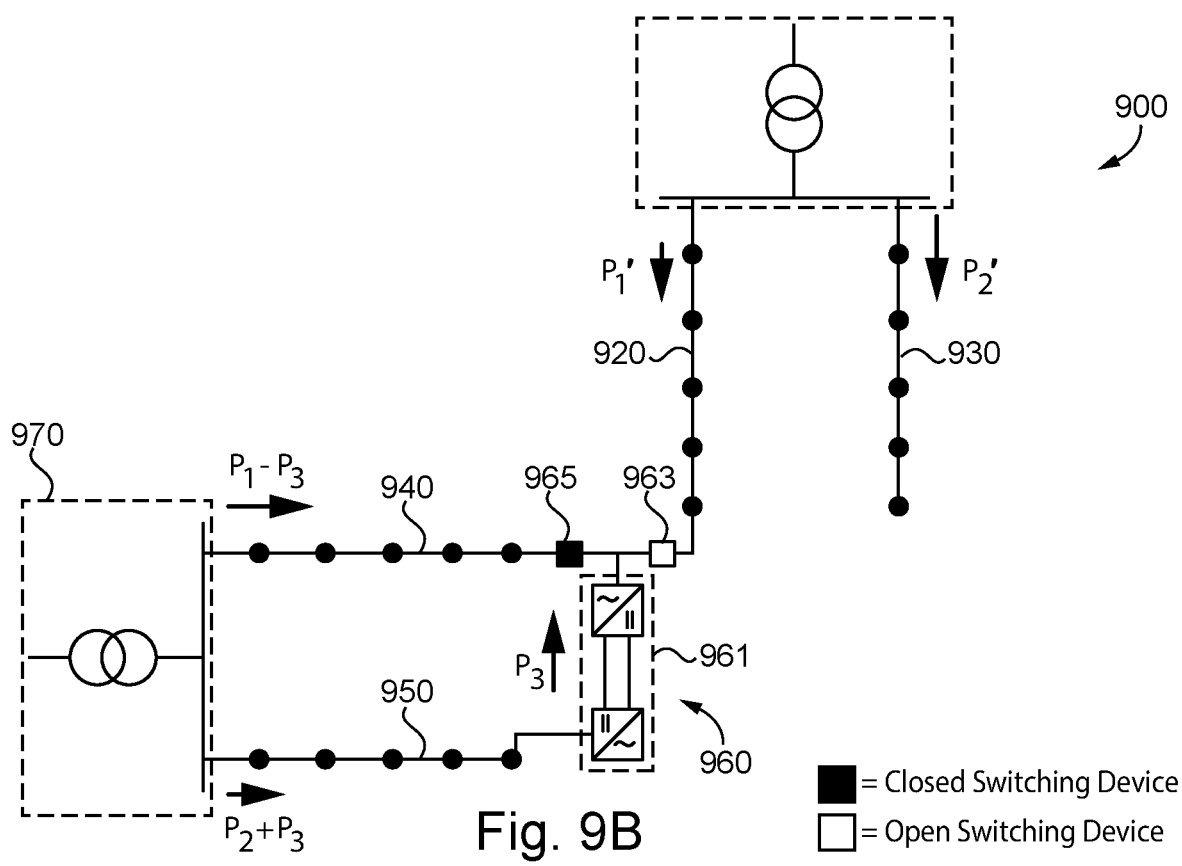

With reference to FIGS. 9A and 9B, there is illustrated an exemplary MVAC distribution network 900 including substation 910 coupled to feeder lines 920 and 930, and substation 970 coupled to feeder lines 940 and 950. Network 900 also includes a DC interconnection system 960 including an AC/AC power converter 961 and switching devices 965 and 963. AC/AC power converter 961 includes a first end coupled to the end of feeder line 950 and a second end coupled to switching devices 963 and 965. When switching device 963 is closed, the second end of converter 961 is coupled to feeder line 920. When switching device 965 is closed, the second end of converter 961 is coupled to feeder line 945.

As illustrated in FIG. 9A, DC interconnection system 960 may be operated to perform an inter-substation power transfer. While switching device 965 is open and switching device 963 is closed, AC/AC power converter 961 is operated to receive power $P_3$ from the end of feeder line 950 and output power $P_3$ to the end of feeder line 920, causing a reduction of power transmitted to feeder line 920 from substation 910. This inter-substation power transfer is effective to balance the headroom of the feeder lines of network 900.

As illustrated in FIG. 9B, DC interconnection system 960 may be structured to perform an intra-substation power transfer. While switching device 963 is open and switching device 965 is closed, AC/AC power converter 961 is operated to receive power $P_3$ from the end of feeder line 950 and output power $P_3$ to the end of feeder line 920, causing a reduction of power transmitted to feeder line 940 from substation 970. This intra-substation power transfer is effective to balance the headroom of the feeder lines of network 900.

It shall be appreciated that any or all of the foregoing features of network 900 may also be present in the other MVAC distribution networks disclosed herein. While the embodiments described herein may not specifically describe features analogous to the features of network 900, such features may nonetheless be employed in connection with the described systems.

Further written description of a number of exemplary embodiments shall now be provided. One embodiment is a direct current (DC) interconnection system for a medium voltage alternating current (MVAC) distribution network comprising: an AC/AC power converter including a first AC terminal and a second AC terminal; a plurality of switching devices structured to selectively couple the first AC terminal to a plurality of feeder line points in the MVAC distribution network; and a control system structured to receive a set of measurements, calculate a headroom value for each feeder line point of the plurality of feeder line points using the set of measurements, select a first feeder line point of the plurality of feeder line points using the calculated headroom values, operate the plurality of switching devices so as to couple the first AC terminal to the first feeder line point, and operate the AC/AC power converter so as to transmit MVAC power from the first AC terminal to the first feeder line point.

In certain forms of the foregoing DC interconnection system, the MVAC distribution network includes a substation coupled to a first and second MVAC feeder lines, and wherein the first feeder line point is located on a first MVAC feeder line and the second feeder line point is located on the second MVAC feeder line. In certain forms, the substation is coupled to a third MVAC feeder line, and wherein the control system is structured to transmit an instruction effective to close a tie switching device coupled between the first MVAC feeder line and the third MVAC feeder line while the AC/AC power converter is transmitting MVAC power to the first feeder line point. In certain forms, DC interconnection system comprises a second plurality of switching devices structured to selectively couple the second AC terminal to a second plurality of feeder line points in the MVAC distribution network, and wherein the control system is structured to calculate a headroom value for each feeder line point of the second plurality of feeder line points using the set of measurements, select a second feeder line point of the second plurality of feeder line points using the calculated headroom values for the first plurality of feeder line points and the second plurality of feeder line points, and operate the second plurality of switching devices so as to couple the second AC terminal to the second feeder line point. In certain forms, operating the AC/AC power converter so as to transmit MVAC power from the first AC terminal to the first feeder line point includes determining an AC/AC power converter operating point using the calculated headroom values for the first plurality of feeder line points and the calculated headroom values for the second feeder line points. In certain forms, the control system is structured to select the first feeder line point in response to determining the headroom value corresponding to the first feeder line point is less than the headroom value corresponding to the other feeder line points of the first plurality of feeder line points. In certain forms, DC interconnection system comprises a plurality of measuring devices structured to generate the set of measurements by measuring an electrical characteristic of each feeder line point of the plurality of feeder line points.

Another exemplary embodiment is a control system for a medium voltage alternating current (MVAC) distribution network comprising: a plurality of measuring devices structured to measure an electrical characteristic of each feeder line point of a plurality of feeder line points; a controller structured to operate an AC/AC power converter including a first AC terminal and a second AC terminal, operate a plurality of switching devices structured to selectively couple the first AC terminal to one of the plurality of feeder line points, receive a set of measurements from the plurality of measuring devices, calculate a headroom value for each feeder line point of the plurality of feeder line points using the set of measurements, select a first feeder line point of the plurality of feeder line points using the calculated headroom values, operate the plurality of switching devices so as to couple the first AC terminal to the first feeder line point, and operate the AC/AC power converter so as to transmit MVAC power to the first feeder line point.

In certain forms of the foregoing control system, the MVAC distribution network includes a substation coupled to a first and second MVAC feeder lines, and wherein the first feeder line point is located on a first MVAC feeder line and the second feeder line point is located on the second MVAC feeder line. In certain forms, the substation is coupled to a third MVAC feeder line, and wherein the controller is structured to transmit an instruction effective to operate a tie switching device coupled between the first MVAC feeder line and the third MVAC feeder line so as to transfer MVAC power from the third MVAC feeder line to the first MVAC feeder line while the AC/AC power converter is transmitting MVAC power to the first feeder line point. In certain forms, the control system comprises a second plurality of switching devices structured to selectively couple the second AC terminal to a second plurality of feeder line points in the MVAC distribution network, and wherein the controller is structured to calculate a headroom value for each feeder line point of the second plurality of feeder line points using the set of measurements, select a second feeder line point of the second plurality of feeder line points using the calculated headroom values for the first plurality of feeder line points and the second plurality of feeder line points, and operate the second plurality of switching devices so as to couple the second AC terminal to the second feeder line point. In certain forms, operating the AC/AC power converter so as to transmit MVAC power from the second feeder line point to the first feeder line point includes determining an AC/AC power converter operating point using the calculated headroom values for the first plurality of feeder line points and the calculated headroom values for the second feeder line points. In certain forms, the controller is structured to select the first feeder line point in response to determining the headroom value corresponding to the first feeder line point is less than the headroom value corresponding to the other feeder line points of the first plurality of feeder line points. In certain forms, the plurality of measuring devices is structured to measure an electrical characteristic of a DC bus of the AC/AC power converter.

A further exemplary embodiment is a method for operating a direct current (DC) interconnection system for a medium voltage alternating current (MVAC) distribution network comprising: operating an AC/AC power converter including a first AC terminal and a second AC terminal; operating a plurality of switching devices structured to selectively couple the first AC terminal to a plurality of feeder line points in the MVAC distribution network; calculating a headroom value for each feeder line point of the plurality of feeder line points using a set of measurements corresponding to electrical characteristics of the MVAC distribution network; selecting a first feeder line point of the plurality of feeder line points using the calculated headroom values; operating the plurality of switching devices so as to couple the first AC terminal to the first feeder line point; and operating the AC/AC power converter so as to receive MVAC power with the second AC terminal and transmit MVAC power from the first AC terminal to the first feeder line point.

In certain forms of the foregoing method, the MVAC distribution network includes a substation coupled to a first and second MVAC feeder lines, and wherein the first feeder line point is located on a first MVAC feeder line and the second feeder line point is located on the second MVAC feeder line. In certain forms, the substation is coupled to a third MVAC feeder line, and wherein the method comprises transmitting an instruction effective to operate a tie switching device coupled between the first MVAC feeder line and the third MVAC feeder line so as to transfer MVAC power from the third MVAC feeder line to the first MVAC feeder line while the AC/AC power converter is transmitting MVAC power to the first feeder line point. In certain forms, the method comprises operating a second plurality of switching devices structured to selectively couple the second AC terminal to a second plurality of feeder line points in the MVAC distribution network; calculating a headroom value for each feeder line point of the second plurality of feeder line points using the set of measurements; selecting a second feeder line point of the second plurality of feeder line points using the calculated headroom values for the first plurality of feeder line points and the second plurality of feeder line points; and operating the second plurality of switching devices so as to couple the second AC terminal to the second feeder line point. In certain forms, operating the AC/AC power converter so as to transmit MVAC power from the second feeder line point to the first feeder line point includes determining an AC/AC power converter operating point using the calculated headroom values for the first plurality of feeder line points and the calculated headroom values for the second feeder line points. In certain forms, selecting the first feeder line point includes determining the headroom value corresponding to the first feeder line point is less than the headroom value corresponding to the other feeder line points of the first plurality of feeder line points.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A direct current (DC) interconnection system for a medium voltage alternating current (MVAC) distribution network comprising:
an AC/AC power converter including a first AC/DC converter, a second AC/DC converter, and a DC link coupled with the first AC/DC converter and the second AC/DC converter;
a plurality of switching devices structured to selectively couple the first AC/DC converter to a first plurality of feeder line points in the MVAC distribution network; and
a control system structured to receive a set of measurements, calculate a headroom value for each feeder line point of the first plurality of feeder line points using the set of measurements, select a first feeder line point of the first plurality of feeder line points using the calculated headroom values, operate the plurality of switching devices so as to couple the first AC/DC converter to the first feeder line point, and operate the first AC/DC power converter to convert and transmit power between the first feeder line point and the DC link, wherein the control system is configured to control the first AC/DC power converter to convert and transmit power from the first feeder line point to the DC link when the headroom value of the first feeder line point is negative.

2. The DC interconnection system of claim 1 wherein the MVAC distribution network includes a substation coupled to a first and second MVAC feeder lines, and wherein the first feeder line point is located on the first MVAC feeder line and a second feeder line point is located on the second MVAC feeder line.

3. The DC interconnection system of claim 2 wherein the substation is coupled to a third MVAC feeder line, and wherein the control system is structured to transmit an instruction effective to close a tie switching device coupled between the first MVAC feeder line and the third MVAC feeder line while the AC/AC power converter is transmitting MVAC power to the first feeder line point.

4. The DC interconnection system of claim 1 comprising a second plurality of switching devices structured to selectively couple the second AC/DC converter to a second plurality of feeder line points in the MVAC distribution network, and wherein the control system is structured to calculate a headroom value for each feeder line point of the second plurality of feeder line points using the set of measurements, select a second feeder line point of the second plurality of feeder line points using the calculated headroom values for the first plurality of feeder line points and the second plurality of feeder line points, and operate the second plurality of switching devices so as to couple the second AC/DC converter to the second feeder line point.

5. The DC interconnection system of claim 4 wherein operating the first AC/DC converter of the AC/AC power converter so as to convert and transmit power between the first feeder line point and the DC link includes determining an AC/AC power converter operating point using the calculated headroom values for the first plurality of feeder line points and the calculated headroom values for the second feeder line points.

6. The DC interconnection system of claim 1 wherein the control system is structured to select the first feeder line point in response to determining the headroom value corresponding to the first feeder line point is less than the headroom value corresponding to the other feeder line points of the first plurality of feeder line points.

7. The DC interconnection system of claim 1 comprising a plurality of measuring devices structured to generate the set of measurements by measuring an electrical characteristic of each feeder line point of the first plurality of feeder line points.

8. A control system for a medium voltage alternating current (MVAC) distribution network comprising:
a plurality of measuring devices structured to measure an electrical characteristic of each feeder line point of a first plurality of feeder line points; and
a controller structured to operate an AC/AC power converter including a first AC/DC converter, a second AC/DC converter, and a and a DC link coupled with the first AC/DC converter and the second AC/DC converter, operate a plurality of switching devices structured to selectively couple the first AC/DC converter to one of the first plurality of feeder line points, receive a set of measurements from the plurality of measuring devices, calculate a headroom value for each feeder line point of the first plurality of feeder line points using the set of measurements, select a first feeder line point of the first plurality of feeder line points using the calculated headroom values, operate the plurality of switching devices so as to couple the first AC/DC converter to the first feeder line point, and operate the first AC/DC power converter to convert and transmit power between the first feeder line point and the DC link, wherein the control system is configured to control the first AC/DC power converter to convert and transmit power from the first feeder line point to the DC link when the headroom value of the first feeder line point exceeds a minimum limit.

9. The control system of claim 8 wherein the MVAC distribution network includes a substation coupled to a first and second MVAC feeder lines, and wherein the first feeder line point is located on the first MVAC feeder line and a second feeder line point is located on the second MVAC feeder line.

10. The control system of claim 9 wherein the substation is coupled to a third MVAC feeder line, and wherein the controller is structured to transmit an instruction effective to operate a tie switching device coupled between the first MVAC feeder line and the third MVAC feeder line so as to transfer MVAC power from the third MVAC feeder line to the first MVAC feeder line while the AC/AC power converter is transmitting MVAC power to the first feeder line point.

11. The control system of claim 8 comprising a second plurality of switching devices structured to selectively couple the second AC/DC converter to a second plurality of feeder line points in the MVAC distribution network, and wherein the controller is structured to calculate a headroom value for each feeder line point of the second plurality of feeder line points using the set of measurements, select a second feeder line point of the second plurality of feeder line points using the calculated headroom values for the first plurality of feeder line points and the second plurality of feeder line points, and operate the second plurality of switching devices so as to couple the second AC/DC converter to the second feeder line point.

12. The control system of claim 11 wherein operating the first AC/DC converter of the AC/AC power converter so as to convert and transmit power between the first feeder line point and the DC link includes determining an AC/AC power converter operating point using the calculated headroom values for the first plurality of feeder line points and the calculated headroom values for the second feeder line points.

13. The control system of claim 8 wherein the controller is structured to select the first feeder line point in response to determining the headroom value corresponding to the first feeder line point is less than the headroom value corresponding to the other feeder line points of the first plurality of feeder line points.

14. The control system of claim 8 wherein the plurality of measuring devices is structured to measure an electrical characteristic of a DC bus of the AC/AC power converter.

15. A method for operating a direct current (DC) interconnection system for a medium voltage alternating current (MVAC) distribution network comprising:
   operating an AC/AC power converter including a first AC/DC converter, a second AC/DC converter, and a DC link coupled with the first AC/DC converter and the second AC/DC converter;
   operating a plurality of switching devices structured to selectively couple the first AC/DC converter to a first plurality of feeder line points in the MVAC distribution network;
   calculating a headroom value for each feeder line point of the first plurality of feeder line points and a second feeder line point selectively coupled to the second AC/DC converter using a set of measurements corresponding to electrical characteristics of the MVAC distribution network;
   selecting a first feeder line point of the first plurality of feeder line points using the calculated headroom values;
   operating the plurality of switching devices so as to couple the first AC/DC converter to the first feeder line point; and
   operating the AC/AC power converter so as to receive MVAC power with the second AC/DC converter and transmit MVAC power from the first AC/DC converter to the first feeder line point when the headroom value of the second feeder line point is negative.

16. The method of claim 15 wherein the MVAC distribution network includes a substation coupled to a first and second MVAC feeder lines, and wherein the first feeder line point is located on the first MVAC feeder line and the second feeder line point is located on the second MVAC feeder line.

17. The method of claim 16 wherein the substation is coupled to a third MVAC feeder line, and wherein the method comprises transmitting an instruction effective to operate a tie switching device coupled between the first MVAC feeder line and the third MVAC feeder line so as to transfer MVAC power from the third MVAC feeder line to the first MVAC feeder line while the AC/AC power converter is transmitting MVAC power to the first feeder line point.

18. The method of claim 15 comprising:
   operating a second plurality of switching devices structured to selectively couple the second AC/DC converter to a second plurality of feeder line points in the MVAC distribution network;
   calculating a headroom value for each feeder line point of the second plurality of feeder line points using the set of measurements;
   selecting the second feeder line point of the second plurality of feeder line points using the calculated headroom values for the first plurality of feeder line points and the second plurality of feeder line points; and
   operating the second plurality of switching devices so as to couple the second AC/DC converter to the second feeder line point.

19. The method of claim 18 wherein operating the AC/AC power converter so as to transmit MVAC power from the second feeder line point to the first feeder line point includes determining an AC/AC power converter operating point using the calculated headroom values for the first plurality of feeder line points and the calculated headroom values for the second feeder line points.

20. The method of claim 15 wherein selecting the first feeder line point includes determining the headroom value corresponding to the first feeder line point is less than the headroom value corresponding to the other feeder line points of the first plurality of feeder line points.

* * * * *